United States Patent
Chen et al.

(10) Patent No.: US 7,133,505 B2
(45) Date of Patent: Nov. 7, 2006

(54) METHOD AND NETWORKING ARCHITECTURE FOR IMPLEMENTING SERVICE VOICE DYNAMIC LOADING ON INTELLIGENT NETWORK

(75) Inventors: Yihua Chen, Guangdon (CN); Mingyu Li, Guangdon (CN); Junqing Bai, Guangdon (CN); Lixin Hu, Guangdon (CN)

(73) Assignee: Huawei Technologies Co., Ltd., Shen Zhen (CN)

( * ) Notice: Subject to any disclaimer, the term of this patent is extended or adjusted under 35 U.S.C. 154(b) by 758 days.

(21) Appl. No.: 10/310,302

(22) Filed: Dec. 5, 2002

(65) Prior Publication Data

US 2003/0179873 A1 Sep. 25, 2003

(51) Int. Cl.
*H04M 1/64* (2006.01)
*H04M 7/00* (2006.01)
(52) U.S. Cl. .............................. 379/88.22; 379/88.25; 379/221.08
(58) Field of Classification Search ............. 379/88.14, 379/88.22, 88.25, 88.26, 88.27, 219, 221.08, 379/221.09, 221.11, 221.12, 230
See application file for complete search history.

(56) References Cited

U.S. PATENT DOCUMENTS 5,646,982 A * 7/1997 Hogan et al. ............. 379/88.22
5,870,454 A    2/1999 Dahlen
6,052,440 A * 4/2000 Yuhn ....................... 379/88.13
6,173,259 B1   1/2001 Bijl et al.
6,301,350 B1   10/2001 Henningson et al.
6,711,240 B1 * 3/2004 Contractor ............... 379/88.12

FOREIGN PATENT DOCUMENTS

WO   WO 98/41038    9/1998
WO   WO 00/23898    4/2000
WO   WO 01/06489 A1  1/2001

OTHER PUBLICATIONS

Tschirgi, Judy E., et al., "Speech Technology and Applications in the Intelligent Network", Proceedings of the International Conference on Communications, New York, IEEE, US, vol. 4, Jun. 14, 1992, pp. 71-75.

* cited by examiner

*Primary Examiner*—Bing Q. Bui
(74) *Attorney, Agent, or Firm*—Dorsey & Whitney LLP

(57) ABSTRACT

A method and networking architecture for implementing service voice dynamic loading on an intelligent network is provided, wherein a voice file and a configuration file are scanned by a voice equipment to perform the voice dynamic loading based on voice requirement of the configuration file at any time. Service voice dynamic loading can be implemented automatically through setting loading conditions and the configuration file. A service voice can be managed by a Service Management System (SMS), rather than only by a switching system. During the service voice loading, the operation will not be affected. The hardware operation is not necessary for loading of the service voice. Furthermore, the voice processing can be performed in a "multiple-to-multiple" mode.

10 Claims, 2 Drawing Sheets

METHOD AND NETWORKING ARCHITECTURE FOR IMPLEMENTING SERVICE VOICE DYNAMIC LOADING ON INTELLIGENT NETWORK

CROSS-REFERENCE TO RELATED APPLICATION(S)

This utility patent application claims the priority of the PCT application, serial number PCT/CN02/00092, filed on Feb. 19, 2002, which claims the priority of the Chinese patent application, serial number 011 12891.7, filed on May 16, 2001; subject matter of which is incorporated herewith by reference.

FIELD OF THE INVENTION

The present invention relates to the field of communication. In particularly, the present invention relates to a method and networking architecture for implementing service voice dynamic loading on an intelligent network.

BACKGROUND OF THE INVENTION

The operation process of an intelligent service requires support of service voice announcement. The voice announcement can be used specially by the services and the users, or can be used commonly by several services. Various kinds of selection and operation can be performed by the users according to the prompts of the service announcement. The voice announcement of the service is one kind of the special resources of SRF (Specialized Resource Function), while SRF also provides the management to the resources. Service Management Function (SMF) manages SRF, and SMF only operates under the request of other functional entities in any case, rather than activating by itself. Today, because the standard interface between SRF and SMF is not existed yet, an essential management relation performed by SMF for SRF is existed. Owing to the comprehensiveness of SRF, operation, management, and maintenance of SRF will be a part of operation, management, and maintenance of an entire switching system, and it can be realized by various ways, such as operator commands, as follows:
 (1) adding or deleting record announcement of existing services;
 (2) generating the record announcement or the words by a voice edit system, which is an off-line tool separated entirely from SRF;
 (3) increasing a voice element without affecting a call processing ability of a switch system, so long as the remaining capacity is existed in a SRF memory.
 (4) integrating a method of SRF hardware expanding and an existing method in the switch system.

Today, the voice announcement of the intelligent service can be stored in an individual IP (Intelligent Peripheral) or an intra-IP of an integrated SSP (Service Switching Point). There are many loading methods, but all of these methods require a lot of interposing and manual operations carried out by a user. Loading of a service voice must be carried out in the case that the service quantity is the minimum, as well as an occupation rate of system resources is the smallest at this time. However, since the location of SSP or IP in the network may be at an end office, or may be at a tandem office, a tall office, or an international exchange, when a new service is opened, voice content in a voice single board at different places must be updated simultaneously to ensure voice versions on all of the SSP or IP modules are identical, this requires a large amount of staffs and time. Changing or updating the single boards or chips, which store voice information, are necessary in the existing loading methods of the user voice announcement. Thus, the normal operation of the service will be affected during a voice loading process, thereby increasing the operation cost of the service.

During an operation process of an existing intelligent network or other intelligent platform, a voice of many telephone-card services does not change frequently, so that the loading of the voice can be completed at the beginning of opening of the service. However, when a service (such as VOT (telephone voting service), MAS (mass call service), AD (telephone advertising service), etc.) associated with a user sponsored service is to be opened, a service voice associated with the user sponsored service must be configured uniformly into the related individual IP, in the network, or in the intra-IP of the integrated SSP, to ensure that the service is opened successfully. Therefore, popularizing to use the service will be affected by a method of loading a user voice announcement into the individual IP, in the network, or in the intra-IP of the integrated SSP.

Changing or updating a voice single board or chip which stores the voice information is typically involved in the existing loading methods of the user voice announcement. Accordingly, the normal operation of the service is affected during the voice loading process, thereby increasing the operation cost of the service.

With the rapid development of an intelligent network service, the demand for service changes or new services has been increasing significantly. However, the rapid development of new services and changes of service are limited by the existing service voice loading methods. For example, in an AD (Advertisement) service, a user of the service may require to modify the service voice at any time based on the service feature of the AD service. If adding or deleting a voice announcement is implemented by using the existing method that manages the user voice announcement on a switch, the difficulty to open such a service on a larger scale network is noticeable. In the meantime, it is extremely difficult to manage those voice announcements on a switch system while ensuring the consistence of the voice version in the respective SSP module.

Accordingly, there is a need for a method and network architecture to overcome the limitation of the existing service voice loading method.

SUMMARY OF THE INVENTION

To solve the above and other problems, the present invention provides a method and network architecture for implementing service voice dynamic loading on an intelligent network. According to the present invention, the SMF management of a user voice announcement resource is realized, and the problem of difficulty in voice management is solved for facilitating the operators to deploy and maintain their services.

In order to implement the present invention, the following technical schemes are used in the present invention:

A service voice dynamic loading method is implemented on an intelligent network, wherein a voice file and a configuration file are scanned by a voice equipment to perform the service voice dynamic loading according to requirement of the configuration file at any time, and wherein the method comprises the steps of:
 (a) compiling a service voice to be loaded into a service voice file;

(b) placing the service voice file to be loaded at a corresponding directory of a Service Management Point (SMP) via a carrier;

(c) configuring the configuration file at a Service Management Access Point (SMAP) according to a requirement of a user for loading the service voice dynamically;

(d) executing commands at the Service Management Access Point (SMAP) to send the configuration file and the service voice file for the service voice dynamic loading to a maintenance platform of a Service Switching Point (SSP) according to the requirement of the user; and (e) performing the service voice dynamic loading automatically by the system itself based on the configuration of the configuration file.

In the method of implementing service voice dynamic loading on the intelligent network as described above, the configuration of the configuration file of the service voice dynamic loading is performed by the Service Management Access Point (SMAP) based on three conditions: priority, resource occupation rate, and processing time.

In the method of implementing service voice dynamic loading on the intelligent network as described above, the priority means that the configuration file with a higher priority is processed prior to the configuration file with a lower priority under the same conditions.

In the method of implementing service voice dynamic loading on the intelligent network as described above, the resource occupation rate refers to: an occupation rate of an announcement resource channel, and the service voice dynamic loading starts when the occupation rate is below a certain value.

In the method of implementing service voice dynamic loading on the intelligent network as described above, the processing time refers to a user-specified or selected time period for performing the service voice dynamic loading.

In the method of implementing service voice dynamic loading on the intelligent network as described above, the service voice comprises a service basic voice and a service user voice; for loading the service user voice, only one service voice is allowed to be loaded in the configuration file; and for loading the service basic voice, a plurality of the service voices may be allowed to be loaded in the configuration file.

In the method of implementing service voice dynamic loading on the intelligent network as described above, the configuration file corresponds to a plurality of terms of the voice services.

In the method of implementing service voice dynamic loading on the intelligent network as described above, the method further comprises the step of processing a plurality of the voice equipments at one time, wherein the service voice dynamic loading for a plurality of service voices and the voice equipments can be configured simultaneously in one configuration file.

In the present invention, a networking architecture for implementing service voice dynamic loading is also provided. The networking architecture comprises a Service Creation Environment (SCE), a Service Management Point (SMP), a Service Control Point (SCP), a Service Switching Point with an Intelligent Peripheral (SSP (IP)), a Service Switching Point Back Administration module (SSP BAM), and a Service Management Access Point (SMAP), wherein the Service Creation Environment (SCE), the Service Management Point (SMP), the Service Control Point (SCP), the Service Switching Point with the Intelligent Peripheral (SSP (IP)), and the Service Switching Point are linked in sequence, at the same time, the Service Management Point is linked with the Service Switching Point Back Administration module (SSP BAM) and the Service Management Access Point (SMAP), respectively. IP equipment may be a built-in equipment of the integrated SSP or an individual equipment. A signal is transferred between the Service Control Point (SCP) and the Service Switching Point with the Intelligent Peripheral (SSP(IP)) via a No. 7 signaling system. A communication interface and a message interface are included in the Service Management Point (SMP). A communication interface is included in the Service Switching Point Back Administration module (SSP BAM). A message interface is included in the Service Management Access Point (SMAP). The Service Management Point (SMP) and the Service Switching Point Back Administration module (SSP BAM) are linked via the communication interface to transfer voice information therebetween according to a TCP/IP protocol. The Service Management Point (SMP) and the Service Management Access Point (SMAP) are linked via the message interface to transfer voice information therebetween according to the TCP/IP protocol.

In the network architecture for implementing service voice dynamic loading as described above, a plurality of voice equipments are also included in the Service Switching Point (SSP), and the voice equipment can be selected during configuration of the configuration file, and wherein the voice equipment comprises an automatic announcing board (e.g. a single SPT board) with a trunking function, a voice processing (VP) platform, and a voice-mail (VM) equipment.

Because the above technical scheme is employed by the present invention, the service voice dynamic loading can be performed automatically by a system via setting the loading conditions and the configuration file, the service voice may be managed by the SMS, rather than only by a switch in the system. Accordingly, the operation of the service is not affected during loading a service voice, and the voice processing can be performed in a "multiple-to-multiple" mode.

These and other features and advantages of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

The detailed performances and features of the present invention will be further described below according to the embodiments and the corresponding drawings.

DETAILED DESCRIPTION OF THE PREFERRED EMBODIMENTS

The method of a service voice dynamic loading of the present invention can be implemented on an intelligent network. It is performed on the intelligent network that a voice file and a configuration file can be scanned by a voice equipment to carry out the service voice dynamic loading according to a requirement of the configuration file at any time. The automatic loading of a service voice file may be implemented by such dynamic loading at and under the specific time and conditions.

Figure 1:
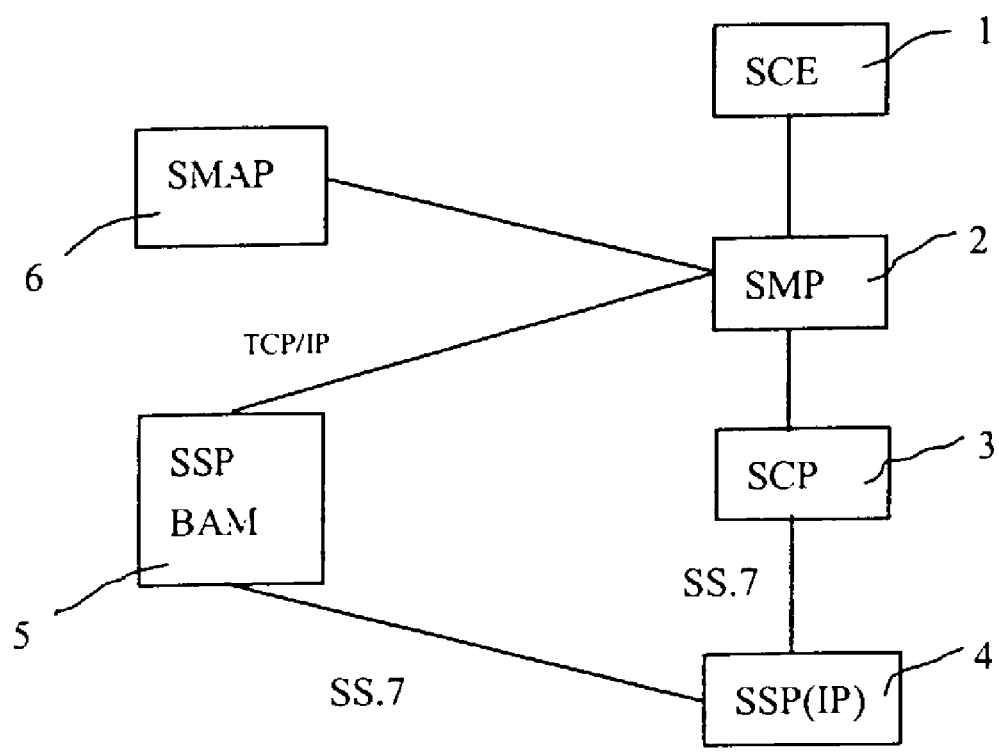
FIG. 1 is a schematic view of a networking architecture of a service voice dynamic loading system in accordance with the principles of the present invention.

Referring to FIG. 1, this is a schematic view of a networking architecture of a service voice dynamic loading system of the present invention. The networking architecture for realizing the service voice dynamic loading of the present invention comprises: a Service Creation Environment (SCE) 1, a Service Management Point (SMP) 2, a Service Control Point (SCP) 3, a Service Switching Point with an Intelligent Peripheral (SSP(IP)) 4, a Service Switching Point Back Administration module (SSP BAM) 5, and a Service Management Access Point (SMAP) 6. The SCE 1, the SMP 2, the SCP 3, the SSP(IP) 4 are linked in sequence, at the same time. The SMP 2 is also linked with the SSP BAM 5 and the SMAP 6, respectively. A signal is transferred between the SCP 3 and the SSP(IP) 4 via a No. 7 signaling system. A communication interface and a message interface are included in the SMP 2. The communication interface is included in the SSP BAM 5. The message interface is included in the SMAP 6. The SMP 2 and the SSP BAM 5 are linked via the communication interface to transfer the voice information according to a TCP/IP protocol. The SMP 2 and the SMAP 6 are linked via the message interface to transfer the voice information according to the TCP/IP protocol.

The service voice dynamic loading of the present invention comprises the steps of:
(a) compiling a service voice to be loaded dynamically into a service voice file;
(b) placing the service voice file to be loaded dynamically by a carrier into a corresponding directory of the SMP 2.
(c) configuring the configuration file at the SMAP 6 according to the requirement of a user for loading the service voice file dynamically;
(d) executing commands at the SMAP 6 to send the configuration file and the service voice file to the service voice dynamic loading to a maintenance platform of the SSP(IP) 4 according to the requirement of a user; and
(e) performing the service voice dynamic loading automatically by the system itself according to the configuration of the configuration file.

It can be seen from FIG. 1 that the function of the present invention is realized by adding a protocol between the SMP 2 and the Intelligent Peripheral (IP). The protocol information between the IP and the intelligent network Service Management System (SMS) relates mainly to the management of the service voice file and the voice, such as increasing, updating, and deleting of the voice. A plurality of configuration files are supported by the protocol between the IP and the SMS. The SMS can send another configuration file and its voice file to the IP when a loading process has not ended. In IP, when a configuration file H with a higher priority is received during the processing of a voice file, if the configuration file A being processed has not been loaded yet, then the loading process being performed is terminated (i.e. terminating to process the configuration file A), and the configuration file H with the higher priority is being processed, whether a voice ID is existed in other configuration files, such as A, B, C etc. is examined. If the voice ID is existed, then the respective voice ID is deleted from these configuration files, and they are not processed.

A service voice dynamic loading of a user voice announcement is configured by an operator through SMAP 6 on an interface, practically, it is operated and processed by the SMP 2. A voice file and a configuration file may be sent to a switching system by the SMP 2, and the configuration file is scanned by the switching system at any time, thus the loading of the respective voice announcements can be implemented based on the configuration of the configuration file.

The service voice described in the present invention is divided into a service basic voice and a service user voice. The dynamic loading managements of these voices are on the different loading interfaces and are controlled based on the authority of the operator, and the methods of processing are different slightly. For loading the service user voice, only one service voice is allowed to be loaded in the configuration file; and for loading the service basic voice, a plurality of the service voices may be allowed to be loaded in the configuration file.

For processing of a configuration file, a configuration of the configuration file of the service voice dynamic loading is performed by the SMAP 6 based on the following conditions: priority, occupation rate of system resources, and processing time. The processing method allows a user to specify process conditions. The priority means that the configuration file with a higher priority is processed prior to the configuration file with a lower priority by the system under the same conditions. The occupation rate of the system resources refers to an occupation rate of an announcement resource channel. The service file dynamic loading is started automatically by the system when such occupation rate is less than a certain value. The processing time refers to a user-specified or selected time period to perform a service voice dynamic loading.

Figure 2:
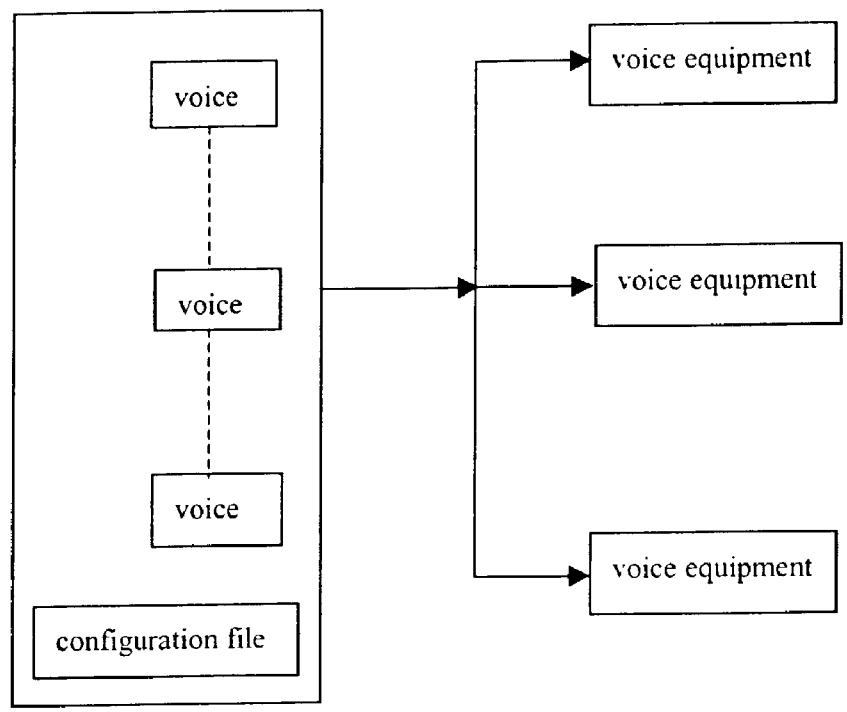
FIG. 2 is a schematic view of a service voice processing structure in accordance with the principles of the present invention.

The processing mode for realizing the service voice dynamic loading of the present invention is shown in FIG. 2. In the requirement of new services, an improved efficiency of voice processing, that is, a "multiple-to-multiple" processing mode, is desired. This method involves the meaning of two aspects: (1) one configuration file corresponds to a plurality of terms of service voices; (2) a plurality of the voice equipments can be processed at one time.

The voice equipment of the present invention is built in the Service Switching Point (SSP), and it can be selected by a setting of a user based on the configuration of the configuration file. The voice equipment comprises an automatic announcing board (single SPT board) with a trunking driving function, a voice processing (VP) platform, and a voice-mail (VM) equipment.

Figure 3:
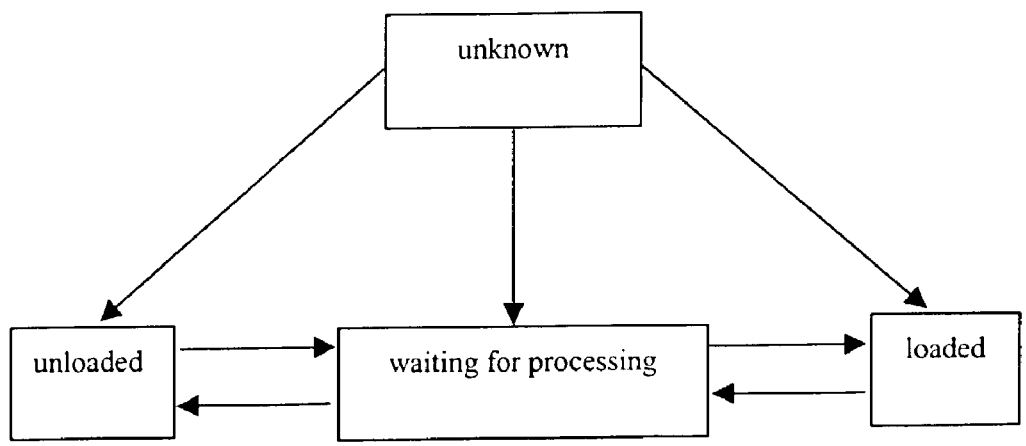
FIG. 3 is a flow chart of a service voice dynamic loading in accordance with the principles of the present invention.

By utilizing a file transmission protocol (FTP tool) by the SMS, the service voice file is transferred to the voice resource equipment, and the service voice file and the configuration file are scanned by the voice equipment in order to carry out the service voice dynamic loading according to the configuration file at any time. During the entire procedure, there are four states for voice processing with a flow chart shown in FIG. 3. After voice processing, the processing state of a service voice is obtained, and four choices are included in the voice processing state: unknown, loaded, unloaded, and waiting for processing. The initial state is "unknown", that is, the voice state is "unknown"

when none voice equipment has been selected by the user. Considering the difference between the implementation condition of the configuration file, the result obtained by a user after ending an operation of service voice dynamic loading processing at the SMAP is the collection of three states of loaded, unloaded, and waiting for processing. When all of the loading conditions specified by the configuration file are satisfied, the configuration file is implemented by the system. If the implementation of the configuration file for loading the service voice is successful at that time, then the state of the service voice is changed form "waiting for processing" to "loaded". If loading the service voice is unsuccessful, then the state of the service voice will be changed from "waiting for processing" to "unloaded". As a result, the query function of the voice processing is provided through a SMP interface to the user, and the service voice dynamic loading state can be monitored and controlled in real time.

After testing, the following functions can be supported by the present invention during the service voice dynamic loading:

(1) supporting to increase, substitute, and delete of a service voice;
(2) supporting to delete a specific configuration file on a voice equipment;
(3) supporting a batch processing of a service voice;
(4) supporting a batch processing of a voice equipment;
(5) supporting a query for a service voice dynamic loading state; and
(6) supporting to carry out the service voice dynamic loading based on the specific file.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

What is claimed is:

1. A method of implementing service voice dynamic loading on an intelligent network, wherein a voice file and a configuration file are scanned by a voice equipment to perform the service voice loading based on a user's requirement of the configuration file at any time, and wherein the method comprises the steps of:
   compiling a service voice to be loaded dynamically into a service voice file;
   placing the service voice to be loaded dynamically in a corresponding directory of Service Management Point (SMP) via a carrier;
   configuring the configuration file at a Service Management Access Point (SMAP) based on the user's requirement for loading the service dynamically;
   executing a command at the Service Management Access Point (SMAP), and transferring the configuration file and the service voice file for the service voice dynamic loading to a maintenance platform of the Service Switching Point (SSP) based on the user's requirement; and
   performing the service voice dynamic loading automatically based on a configuration of the configuration file.

2. The method of implementing service voice dynamic loading on the intelligent network according to claim 1, wherein the configuration of the configuration file for the service voice dynamic loading is carried out by the Service Management Access Point (SMAP) based on conditions including priority, occupation rate of resources, and processing time.

3. The method of implementing service voice dynamic loading on the intelligent network according to claim 2, wherein the configuration file with a higher priority is processed prior to the configuration file with a lower priority under the same conditions.

4. The method of implementing service voice dynamic loading on the intelligent network according to claim 2, wherein the occupation rate of resources includes an occupation rate of an announcement resource channel, and the service voice dynamic loading is started when the occupation rate is below a certain value.

5. The method of implementing service voice dynamic loading on the intelligent network according to claim 2, wherein the processing time includes a user-specified time period for performing the service voice dynamic loading.

6. The method of implementing service voice dynamic loading on the intelligent network according to claim 2, wherein the service voice is divided into a service basic voice and a service user voice, for loading the service user voice, only one service voice is allowed to be loaded in the configuration file; and for loading the service basic voice, a plurality of the service voices are allowed to be loaded in the configuration file.

7. The method of implementing service voice dynamic loading on the intelligent network according to claim 1, wherein the configuration file corresponds to a plurality of terms of the source voices.

8. The method of implementing service voice dynamic loading on the intelligent network according to claim 1, further comprising the step of processing a plurality of voice equipment at one time, wherein the service voice dynamic loading for a plurality of service voices and for a plurality of the voice equipments can be configured simultaneously in one configuration file.

9. A networking architecture for implementing service voice dynamic loading comprising:
   a Creation Environment (SCE);
   a Service Management Point (SMIP);
   a Service Control Point (SCP);
   a Service Switching Point with an Intelligent Peripheral (SSP (IIP));
   a Service Switching Point Back Administration module (SSP BAM);
   a Service Management Access Point (SMAP);
   wherein the Service Creation Environment (SCE), the Service Management Point (SMP), the Service Control Point (SCP), the Service Switching Point with the Intelligent Peripheral (SSP(JP)), and the Service Switching Point (SSP) are linked in sequence, the Service Management Point is linked with the Service Switching Point Back Administration module (SSP BAM) and the Service Management Access Point (SMAP), respectively;
   wherein a signal is transferred between the Service Control Point (SCP) and the Service Switching Point with the Intelligent Peripheral (SSP(IIP)) via a No. 7 signaling system;
   wherein a communication interface and a message interface are included in the Service Management Point;
   wherein a communication interface is included in the Service Switching Point Back Administration module (SSP BAM), a message interface is included in the Service Management Access Point (SMAP); and wherein the service Management Point (SMP) and the Service Switching Point Back Administration module (SSP BAM) are linked via the communication interface to transfer voice information therebetween according to a TCP/IP protocol, and the Service Management Point (SMP) and the Service Management Access Point (SMAP) are linked via the message interface to transfer voice information therebetween according to the TCP/IP protocol.

10. The network architecture for implementing service voice dynamic loading according to claim 9, wherein a plurality of voice equipments are included in the Service Switching Point (SSP), and selection of the voice equipment can be set during configuration of a configuration file, and wherein each voice equipment comprises an automatic announcing board with a trunking function, a voice processing platform, and a voice-mail equipment.

* * * * *

UNITED STATES PATENT AND TRADEMARK OFFICE
CERTIFICATE OF CORRECTION

| | | |
|---|---|---|
| PATENT NO. | : 7,133,505 B2 | Page 1 of 1 |
| APPLICATION NO. | : 10/310302 | |
| DATED | : November 7, 2006 | |
| INVENTOR(S) | : Chen et al. | |

It is certified that error appears in the above-identified patent and that said Letters Patent is hereby corrected as shown below:

Title page, Item (63) is missing. Item (63) should read as follows,

-- Related U.S. Application Data

(63) Continuation of application No. PCT/CN02/00092 filed on Feb. 19, 2002.--

Title page, Item (30) is missing. Item ( 30) should read as follows,
-- (30) Foreign Application Priority Data

May 16, 2001 (CN).............................................................. 01112891.7 --

Signed and Sealed this

Sixth Day of February, 2007

JON W. DUDAS
*Director of the United States Patent and Trademark Office*